April 19, 1949.  F. K. FLOYD  2,467,615

SPINDLE TIP FOR COMPARATOR GAUGES

Filed Nov. 5, 1945

Inventor:
Frederick Kessler Floyd,

By Pierce & Scheffler,
Attorneys.

Patented Apr. 19, 1949

2,467,615

UNITED STATES PATENT OFFICE 2,467,615

SPINDLE TIP FOR COMPARATOR GAUGES

Frederick Kessler Floyd, Denver, Colo., assignor to Metron Instrument Company, Denver, Colo., a corporation of Colorado Application November 5, 1945, Serial No. 626,627

2 Claims. (Cl. 33—143)

This invention relates to spindle tips for comparator gages and more particularly to spindle tips that include adjustably mounted work-engaging elements.

The useful spindle tips of comparator gages are rounded to engage the specimen or work piece under test with a point contact. Such devices are not entirely satisfactory when the work piece is an article or sheet of soft or delicate material that may be deformed by the pressure applied by a rounded gage tip. The rounded gage tip therefore is not well adapted for the measurement of the thickness of thin foils, paper or rubber sheets, fine wire, rods or balls as the sheet material may be deformed by the contact pressure and it is difficult or impossible to seat a rounded gage tip upon the maximum thickness point of a cylindrical or spherical object. A gage tip with a flat surface of appreciable area is therefore desirable for testing or thickness measurement of various materials, but the practical utility of a flat tip depends upon the degree of flatness of the tip surface and its degree of parallelism with the anvil on which the work piece is supported. Flat gage tips have been used extensively for special work and, in general, have been fairly satisfactory but the prior constructions have been open to the objection that it has been difficult to locate and maintain the flat surface of the work-engaging tip parallel to the surface of the work-suporting anvil.

Objects of the present invention are to provide gage tips for comparator gages that include work-engaging elements adjustably supported on the gage spindle and to provide gage tips for comparator gages that include elements with flat or rounded work-engaging surfaces, the gage tips being adjustably mounted on the gage spindle of the comparator gage. More specifically, an object is to provide a gage spindle having a conical or spherical seat for a work-engaging element having a spherical surface for engagement with the seat on the gage spindle.

These and other objects and advantages of the invention will be apparent from the following description when taken with the accompanying drawings in which.

Figure 1:
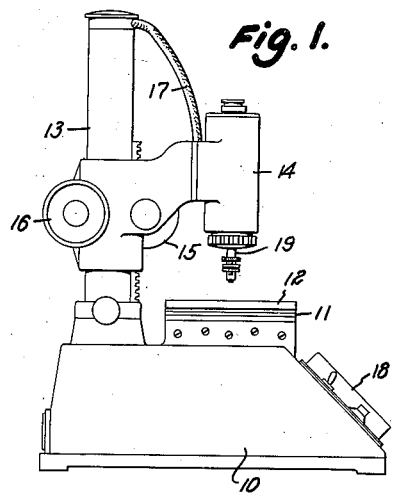
Fig. 1 is a side elevation of a comparator gage in which a spindle tip of the present invention is incorporated.
Figure 2:
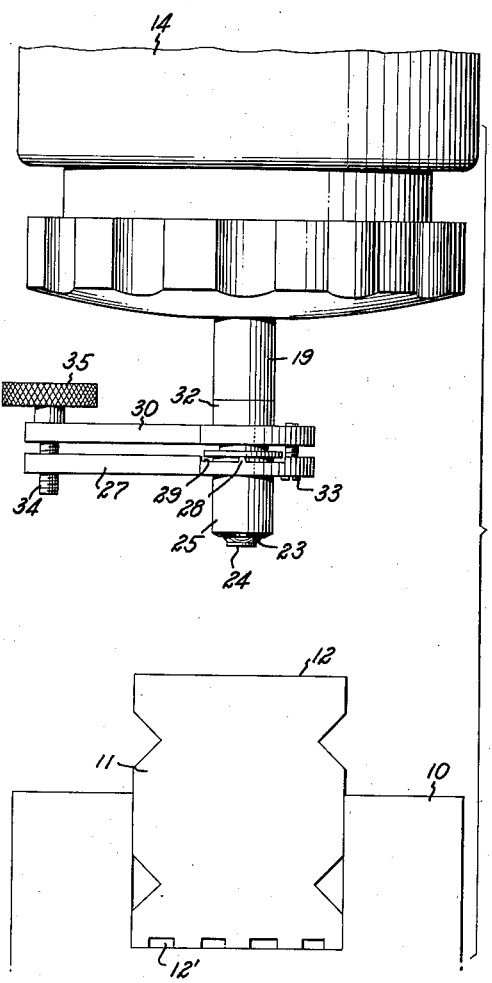
Fig. 2 is a fragmentary front elevation, on an enlarged scale, of the spindle tip assembly and associated parts of Fig. 1.

The novel gage tip construction may be incorporated in various types of mechanical and electrical comparator gages and for purpose of illustration, the invention is shown as applied to an electrical comparator gage such as described and claimed in my prior application Ser. No. 499,282, filed Aug. 19, 1943, which matured into Patent No. 2,437,639 on March 9, 1948. The comparator gage includes a base 10 on which is mounted an anvil 11 having a plane surface 12 and an opposite grooved surface 12', either of which may be arranged at the top to support the work piece that is to be measured. A column 13 extends above the base 10 to support the gage head 14 which may be adjusted along the column 13 by a handwheel 15 and clamped to the column by a handwheel 16; as described in detail in the prior application. Variable reactance elements, not shown, are mounted within the gage head 14 and connected by a cable 17 to the measuring instrument 18 which is mounted on the base, the effective values of the reactances being controlled by axial movement of the spindle 19 which extends below the gage head 14 and is displaced in accordance with the thickness of the work piece placed upon the anvil 11.

Figure 3:
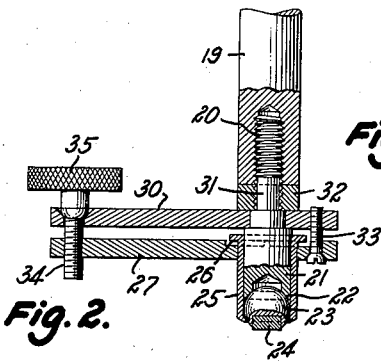
Fig. 3 is a longitudinal section through the spindle tip assembly.

The construction so far as described above may be replaced by functionally equivalent parts as the present invention resides in the adjustable spindle tip and the mechanism for securing the same to the spindle 19. As shown in Fig. 3, the lower end of the spindle 19 has a threaded bore for receiving the threaded end 20 of a seat member 21 which has a lower counterbored end to provide an annular, and preferably conical, seating surface 22. A spherical ball 23 with a flat surface or, as shown, with an inserted piece 24 of boron carbide having a flat surface projecting beyond the ball, is clamped to the annular seat 22 by the lower inturned edge of a sleeve member 25 which is telescoped over the seat member 21 and has an upper outwardly directed flange 26.

Figure 4:
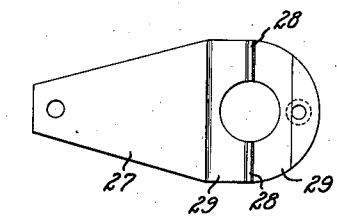
Fig. 4 is a plan view of the bottom clamp plate.

The sleeve 25 extends through an aperture in the clamping plate 27, and the flange 26 rests upon the alined radial ribs 28, 28 or knife edge that is formed by cutting two parallel grooves 29, 29 in the upper surface of the clamping plate. The upper clamping plate 30 has a relatively small opening which will pass the threaded end 20 and reduced diameter neck 31 of the stem of the seat member 21, but which is smaller than the seat member 21. A spacing washer or bushing 32 with accurately parallel faces is arranged at the lower flat end of the spindle 19, and the plate 30 is securely held between the bushing 32 and the seat member 21. The bushing 32 is threaded to prevent inadvertent loss when the spindle tip assembly is removed from the spindle 19, but the bushing loosely surrounds the reduced diameter neck 31 of the stem when the parts are in assembled position. The clamping plates are connected by a fillister headed restraining screw 33 and a clamping screw 34 which is provided with a small handwheel or adjusting knob 35. The screw 33 extends through an opening in lower plate 27 and is threaded into the upper plate 30 to serve as a pivot for the lower plate 27, and the screw 34 is reversely arranged to pass freely through the upper plate and to thread into the lower plate. As best shown in Fig. 4, the ribs 28 which support the sleeve 25 are normal to a line through the connecting screws of the clamp. The clamping pressure is therefore effectively applied along the axis of the sleeve 25 to slide the same axially upon the seat member 21, and side pressures are completely eliminated by adjustment of the restraining screw 33 in accordance with the diameter of ball or gage tip 23.

With the parts assembled as shown, the flat surface 24 of the gage tip may be quickly adjusted into exact parallelism with the surface of the anvil 11 by loosening the clamp screw 34 to free the ball 23 to turn on its seat, lowering the gage head 14 to engage the flat surface 24 with the anvil 11, and then tightening the clamp screw 34 while the surface 24 is in contact with the anvil. Thus, when the gage head is raised on the column, absolute parallelism of the gage tip flat and the anvil is insured. A parallelism, measured from one edge of the flat surface to the other, of within five millionths of an inch is readily obtained in practice. Other angular arrangements may be desired with certain work pieces, and such adjustments are made in the manner described above but with the gage tip seated upon a work piece which rests on the anvil.

While the invention is particularly useful as applied to gage tips having flat surfaces for engagement with relatively soft materials, sheets and films, it is also useful when the gage tip element is a sphere without a flat surface. The tip elements are usually hardened steel balls but even these wear flat in time, and a new rounded surface is had by loosening the clamp and turning the ball to present a new spherical surface to the anvil. A single mounting head and a number of gage tip balls of different character may be supplied for a comparator gage or a number of mounting heads with tip elements of different characters may be provided when the comparator gage is employed for checking only relatively small quantities of work pieces of different types. As noted above, the insert 24 of boron carbide or other exceedingly hard material is not essential as the flat surface may be formed directly on the ball 23. For example, chrome vanadium steel balls 23 of one-quarter inch diameter with a ground and lapped flat surface of three-sixteenths of an inch diameter have proved quite satisfactory. Other steels or hard alloys, and other dimensions may of course be used.

Since certain further changes can be made in the foregoing construction without departing from the spirit and scope of the invention, it will be understood that the matter set forth hereinbefore and shown on the accompanying drawing is to be interpreted as illustrative and not in a limiting sense.

I claim:

1. A tip assembly for the spindle of a comparator gage comprising, a seat member adapted to be carried by the spindle and provided with a seat portion, a generally spherical contact member having an outwardly facing flat work-engaging surface disposed in said seat portion, a sleeve telescoped over and axially slidable upon said seat member and having an inturned edge for contact with said contact member to hold the same in position, and clamp means for sliding said sleeve axially upon said seat member to clamp said contact member rigidly between the seat portion of the seat member and the inturned edge of said sleeve with the work-engaging surface of the contact member in predetermined angular position with respect to the axis of said sleeve, said generally spherical contact member being angularly adjustable upon the seat portion of said seat member upon adjustment of said clamp means to relieve the clamping pressure exerted upon said contact member by the inturned edge of said sleeve.

2. A tip assembly for the spindle of a comparator gage comprising, a seat member adapted to be carried by the spindle and provided with a seat portion, a spherical contact member having an outwardly facing flat work-engaging surface disposed in said seat portion, a sleeve telescoped on said seat member and having a seat portion at one end formed by an inwardly extending lip for cooperating with said contact member to hold it in position and an annular flange at the other end, a pair of interacting clamp members, one cooperating with said seat member and the other cooperating with the annular flange of said sleeve, and means to draw said clamp members together to hold said contact member with the work-engaging surface thereof in predetermined angular position.

FREDERICK KESSLER FLOYD.

REFERENCES CITED

The following references are of record in the file of this patent:

UNITED STATES PATENTS

| Number | Name | Date |
|---|---|---|
| 1,182,861 | Spencer | May 9, 1916 |
| 1,300,428 | Lowenstein | Apr. 15, 1919 |
| 1,478,664 | La Batt | Dec. 25, 1923 |
| 1,890,827 | Pratt | Dec. 13, 1932 |
| 1,928,457 | Mershon et al. | Sept. 26, 1933 |
| 2,220,040 | Hathaway et al. | Oct. 29, 1940 |

FOREIGN PATENTS

| Number | Country | Date |
|---|---|---|
| 203,718 | Switzerland | Mar. 15, 1939 |
| 367,302 | Germany | Jan. 19, 1923 |
| 549,816 | Great Britain | Dec. 8, 1942 |

OTHER REFERENCES

Publ.: Grits and Grinds, vol. 34, Number 7, page 11, July, 1943.